US010270264B2

(12) United States Patent
Yoon

(10) Patent No.: US 10,270,264 B2
(45) Date of Patent: Apr. 23, 2019

(54) BATTERY PACK MANAGEMENT APPARATUS SELECTIVELY CONTROLLING BATTERY CELLS

(71) Applicant: LG CHEM, LTD., Seoul (KR)

(72) Inventor: Du-Seong Yoon, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 15/568,181

(22) PCT Filed: Nov. 1, 2016

(86) PCT No.: PCT/KR2016/012469
§ 371 (c)(1),
(2) Date: Oct. 20, 2017

(87) PCT Pub. No.: WO2017/086632
PCT Pub. Date: May 26, 2017

(65) Prior Publication Data
US 2018/0138722 A1 May 17, 2018

(30) Foreign Application Priority Data
Nov. 18, 2015 (KR) .................. 10-2015-0161820

(51) Int. Cl.
*H02J 7/00* (2006.01)
(52) U.S. Cl.
CPC .............. *H02J 7/0021* (2013.01); *H02J 7/00* (2013.01); *H02J 7/0042* (2013.01)
(58) Field of Classification Search
CPC ........... H02J 7/0021; H02J 7/0042; H02J 7/00
See application file for complete search history.

(56) References Cited

U.S. PATENT DOCUMENTS 4,562,398 A * 12/1985 Kotlarewsky ......... H02J 7/0075
320/128
6,511,764 B1 * 1/2003 Marten ............... H01M 10/441
320/119

(Continued)

FOREIGN PATENT DOCUMENTS

JP 2013-520947 A 6/2013
JP 2015-33159 A 2/2015
(Continued)

OTHER PUBLICATIONS

International Search Report, issued in PCT/KR2016/012469 (PCT/ISA/210), dated Feb. 20, 2017.

*Primary Examiner* — Naum Levin
(74) *Attorney, Agent, or Firm* — Birch, Stewart, Kolasch & Birch, LLP

(57) ABSTRACT

Provided is a battery pack management apparatus that effectively improves the life of a battery pack. The battery pack management apparatus is an apparatus for managing a battery pack, in which a plurality of battery cells are electrically connected to each other, and includes: a measurement unit configured to measure the number of charging and discharging cycles of each of the plurality of battery cells; a selection unit configured to select at least some battery cells from among battery cells whose number of charging and discharging cycles measured by the measurement unit reached a reference number; and a blocking unit configured to stop operations of the at least some battery cells selected by the selection unit for a first reference time.

11 Claims, 4 Drawing Sheets

(56) References Cited

U.S. PATENT DOCUMENTS

| | | | |
|---|---|---|---|
| 6,538,414 B1* | 3/2003 | Tsuruga | H02J 7/0016 320/119 |
| 6,664,000 B1* | 12/2003 | Sonobe | H01M 2/34 429/100 |
| 7,494,729 B2* | 2/2009 | Odaohhara | H01M 10/4207 320/135 |
| 7,518,340 B2* | 4/2009 | Sterz | H02J 7/0068 320/131 |
| 7,786,699 B2* | 8/2010 | Demers | H02J 7/0014 320/116 |
| 7,825,628 B2* | 11/2010 | Kuroda | H02J 7/0016 320/116 |
| 8,044,637 B2* | 10/2011 | Thivierge | B60L 3/0046 320/116 |
| 8,120,321 B2* | 2/2012 | Vezzini | H02J 7/0014 320/118 |
| 8,816,644 B2* | 8/2014 | Pisharodi | H02J 7/027 320/149 |
| 9,018,912 B2* | 4/2015 | Burstein | H02J 7/0019 320/116 |
| 9,024,589 B2* | 5/2015 | Kasahara | B60L 3/0046 320/134 |
| 9,065,292 B2* | 6/2015 | Yazami | H02J 7/0081 |
| 9,097,774 B2* | 8/2015 | White | G01R 31/3658 |
| 9,145,059 B2* | 9/2015 | Gibbs | G01R 31/3624 |
| 9,153,973 B2* | 10/2015 | Nalbant | H02J 7/0016 |
| 9,159,990 B2* | 10/2015 | Amiruddin | H01M 4/131 |
| 9,160,179 B2* | 10/2015 | Someya | H02J 7/00 |
| 9,413,189 B2* | 8/2016 | Maleki | H02J 7/0091 |
| 9,415,699 B2* | 8/2016 | Morioka | H01M 10/441 |
| 9,454,888 B2* | 9/2016 | Xie | G08B 29/181 |
| 9,484,753 B2* | 11/2016 | Bui-Van | B60L 3/0046 |
| 9,531,038 B2* | 12/2016 | Thompson | H01M 10/425 |
| 9,864,012 B2* | 1/2018 | Moganty | H01M 10/448 |
| 9,885,757 B2* | 2/2018 | Liu | G01R 31/362 |
| 9,889,752 B2* | 2/2018 | Zhou | B60L 11/1811 |
| 10,110,061 B2* | 10/2018 | Hinterberger | H02J 3/18 |
| 2007/0001651 A1* | 1/2007 | Harvey | H02J 7/0016 320/166 |
| 2007/0075678 A1* | 4/2007 | Ng | H02J 7/047 320/106 |
| 2010/0213897 A1 | 8/2010 | Tse | |
| 2012/0293130 A1* | 11/2012 | Burstein | H02J 7/0019 320/134 |
| 2013/0049702 A1 | 2/2013 | Dai et al. | |
| 2013/0278216 A1 | 10/2013 | Son et al. | |
| 2013/0278218 A1* | 10/2013 | Onnerud | H01M 10/441 320/118 |
| 2014/0097787 A1* | 4/2014 | Lin | H02J 7/0018 320/103 |
| 2014/0266062 A1 | 9/2014 | Lee | |
| 2016/0036096 A1* | 2/2016 | Yoshida | G01R 31/3679 429/50 |
| 2016/0064961 A1* | 3/2016 | DiCarlo | H02J 7/007 320/157 |
| 2016/0291683 A1* | 10/2016 | Kacker | G06F 1/3212 |
| 2016/0322842 A1* | 11/2016 | Sorhage | H02J 7/0044 |
| 2016/0336767 A1* | 11/2016 | Zane | H02J 7/0021 |
| 2017/0214256 A1* | 7/2017 | Hardy | H02J 7/0013 |

FOREIGN PATENT DOCUMENTS

| | | |
|---|---|---|
| KR | 10-2007-0101571 A | 10/2007 |
| KR | 10-1349874 B1 | 1/2014 |
| KR | 10-1440889 B1 | 9/2014 |
| KR | 10-1477272 B1 | 1/2015 |
| KR | 10-2015-0050215 A | 5/2015 |
| WO | WO 2013/176379 A1 | 11/2013 |

* cited by examiner

BATTERY PACK MANAGEMENT APPARATUS SELECTIVELY CONTROLLING BATTERY CELLS

TECHNICAL FIELD

The present application claims priority to Korean Patent Application No. 10-2015-0161820 filed on Nov. 18, 2015 in the Republic of Korea, the disclosure of which is incorporated herein by reference.

The present disclosure relates to a technology of managing a battery pack, and more particularly, to a battery pack management apparatus and a battery pack management method, which improve the life of a battery pack by controlling charging and discharging.

BACKGROUND ART

In the modern society, batteries are widely used in various apparatuses, from portable electronic products, such as a laptop computer, a camera, a mobile phone, and an MP3 player, to cars, robots, and satellites. The batteries may be classified into primary batteries and secondary batteries, and the secondary batteries are widely used due to big advantages in that the secondary batteries are repeatedly chargeable and dischargeable and that the secondary batteries are capable of storing energy.

Currently commercialized secondary batteries are nickel cadmium batteries, nickel hydrogen batteries, nickel zinc batteries, and lithium secondary batteries, and the lithium secondary batteries have the limelight due to advantages in that the lithium secondary batteries are freely charged and discharged because a memory effect is hardly generated compared to nickel-based secondary batteries, have very low self-discharge rates, and have high energy densities.

In such secondary batteries, one battery cell may be solely used, but in most cases, a plurality of battery cells are electrically connected to each other in one battery pack such that a higher output and higher capacity are obtained. In particular, recently, a smart grid system is receiving attention in terms of resolving imbalance of power supply. The smart grid system is an intelligence power grid system for increasing efficiency of using power via an interaction of power supply and power consumption by grafting an information and communication technology onto power generating, transmitting, and consuming processes. An amount of power used by a consumer may not be always uniform, but may frequently change. Representatively, an amount of power used may rapidly increase on a summer afternoon due to use of an air conditioner and may rapidly decrease at night. As such, power consumption is not uniform and may frequently change in terms of consuming power, but it is practically difficult to adapt to such power consumption even when power generation is somewhat adjusted in terms of supplying power. Accordingly, power supply surplus or power supply shortage may occur due to such imbalance between power supply and power consumption, and in this regard, the smart grid system flexibly adjusts a power supply amount by determining a power usage state in real-time. One of core components important in building such a smart grid system is a power storage apparatus. Also, such a power storage apparatus includes the much more number of battery cells that are electrically connected to each other than that of a battery pack used in a general electronic device or portable product.

A battery pack used while a plurality of battery cells are electrically connected to each other as above may be used not only in the smart grid system, but also in other various fields, such as a micro grid system and an electric vehicle charging station for supplying charging power to an electric vehicle.

As such, applied fields of the battery pack further expand to a large battery pack, and according to improvement of performance of an apparatus to which the battery pack is applied, improved performance of the battery pack itself is continuously demanded. There may be various factors for evaluating performance of the battery pack, and one of representative factors indicating the performance of the battery pack is a life.

The battery pack is an apparatus configured to be repeatedly chargeable and dischargeable, but the battery pack is no longer usable if charging and discharging cycles are repeated. In particular, performance of a secondary battery included in the battery pack may decrease as an internal material of the secondary battery deteriorates while charging and discharging are repeated, and thus a time when the battery pack does not properly operate may come.

In such a situation, the life of the battery pack should be maintained long such that the battery pack is used as long as possible. Moreover, when lives of some secondary batteries from among many secondary batteries included in the battery pack are ended, the performance of the battery pack may decrease in overall. Accordingly, the life of each secondary battery included in the battery pack needs to be lengthened as much as possible.

In particular, since a size of the power storage apparatus is very large, it is not easy to find, replace, or repair a dead secondary battery. Thus, it is preferable that the battery pack included in the power storage apparatus has a long life so as to be used for a long period of time after installation.

DISCLOSURE

Technical Problem

The present disclosure is designed to solve the problems of the related art, and therefore the present disclosure is directed to providing a battery pack management apparatus and a battery pack management method, which effectively improve the life of a battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack management apparatus for managing a battery pack, in which a plurality of battery cells are electrically connected to each other, the battery pack management apparatus including: a measurement unit configured to measure the number of charging and discharging cycles of each of the plurality of battery cells; a selection unit configured to select at least some battery cells from among battery cells whose number of charging and discharging cycles measured by the measurement unit reached a reference number; and a blocking unit configured to stop operations of the at least some battery cells selected by the selection unit for a first reference time.

Here, the battery pack management apparatus may further include a speed reduction unit configured to, when the operations of the at least some battery cells stopped by the blocking unit are resumed, perform charging and discharging for a second reference time at a C-rate lower than a C-rate before being stopped.

Also, the second reference time may be one charging and discharging cycle.

Also, the speed reduction unit may be configured to, when the stopped operations of the at least some battery cells are resumed, perform charging and discharging for the second reference time at half or less the C-rate before being stopped.

Also, the selection unit may be configured to sequentially select battery cells one by one when there are a plurality of battery cells whose number of charging and discharging cycles reached the reference number.

Also, the reference number may be set to be at least one of 200 to 400.

Also, the first reference time may be set to be at least one of 2 days to 4 days.

Also, two or more of the reference numbers may be set.

Also, the blocking unit may include a switching device that turns on or off an electric connection of each of the plurality of battery cells, and be configured to stop or resume an operation of each of the plurality of battery cells by controlling the switching device.

Also, in another aspect of the present disclosure, there is also provided a battery pack including the battery pack management apparatus according to the present disclosure.

Also, in another aspect of the present disclosure, there is also provided a power storage apparatus including the battery pack management apparatus according to the present disclosure.

Also, in another aspect of the present disclosure, there is also provided a battery pack management method for managing a battery pack, in which a plurality of battery cells are electrically connected to each other, the battery pack management method including: measuring the number of charging and discharging cycles of each of the plurality of battery cells; selecting at least some battery cells from among battery cells whose number of charging and discharging cycles measured in the measuring reached a reference number; and stopping operations of the at least some battery cells selected in the selecting operation for a first reference time.

Advantageous Effects

According to an aspect of the present disclosure, the life of a battery pack may be effectively improved.

In particular, according to the present disclosure, the life of the battery pack may be improved by controlling charging and discharging, without having to change a material of a lithium secondary battery.

Accordingly, according to such an aspect of the present disclosure, replacement or repair of a battery pack may be minimized, and an apparatus to which the battery pack is applied, such as a power storage apparatus, may be stably driven for a long time.

DESCRIPTION OF DRAWINGS

The accompanying drawings illustrate a preferred embodiment of the present disclosure and together with the foregoing disclosure, serve to provide further understanding of the technical concept of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
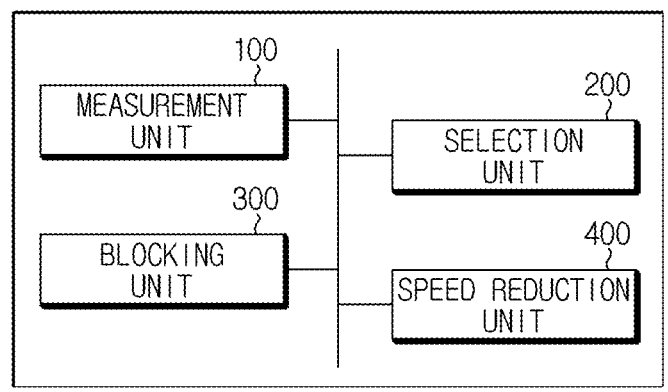
FIG. 1 is a block diagram of a functional structure of a battery pack management apparatus, according to an embodiment of the present disclosure.

FIG. 1 is a schematic block diagram of a functional configuration of a battery pack management apparatus, according to an embodiment of the present disclosure. Also, FIG. 2 is a schematic diagram of a configuration in which a battery pack management apparatus is connected to a battery pack, according to an embodiment of the present disclosure.

Figure 2:
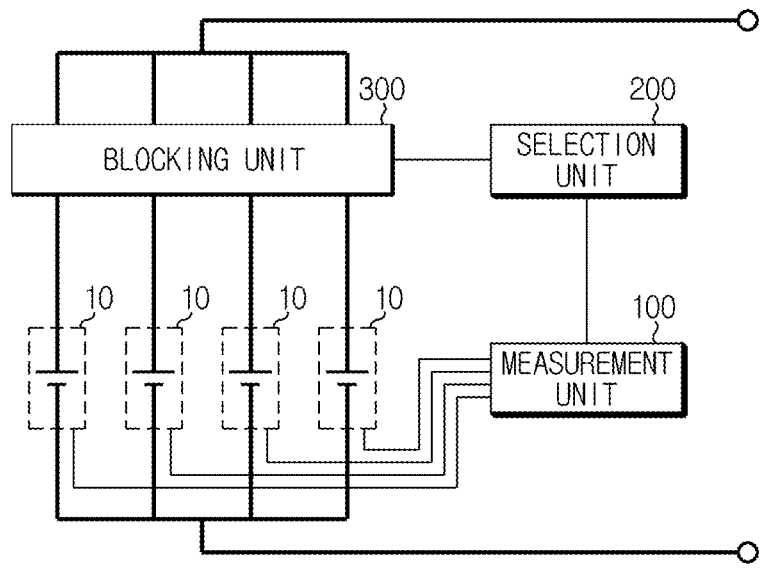
FIG. 2 is a diagram of a configuration in which a battery pack management apparatus is connected to a battery pack, according to an embodiment of the present disclosure.

Referring to FIGS. 1 and 2, a battery pack management apparatus according to the present disclosure includes a measurement unit 100, a selection unit 200, and a blocking unit 300.

The battery pack management apparatus according to the present disclosure may manage a battery pack in which a plurality of battery cells 10 are electrically connected to each other. For example, the battery pack management apparatus according to the present disclosure may perform a management function on the battery pack in which the plurality of battery cells 10 are connected in parallel as shown in FIG. 2.

The measurement unit 100 may measure the number of charging and discharging cycles of each of the battery cells 10 included in the battery pack. For example, as shown in FIG. 2, when four battery cells 10 are included in the battery pack, the measurement unit 100 may measure the number of charging and discharging cycles performed with respect to each of the four battery cells 10.

Here, the number of charging and discharging cycles may be counted in consideration that a case in which the battery cell 10 is charged to a full-charge state from a full-discharge state and then is fully discharged is one cycle. In other words, the measurement unit 100 may count a duration when a state of charge (SOC) of the battery call 10 is changed from 0 to 100, and then back to 0, as one charging and discharging cycle.

However, the battery cell 100 may be charged again while it is not fully discharged, or may be discharged again while it is not fully charged. In this case, the measurement unit 100 may count charging and discharging cycles via any one of various methods.

For example, the measurement unit 100 may count charging and discharging cycles in proportion to charged or discharged SOC amounts. For instance, when SOC is charged from 0 to 50 and then discharged back to 0 with respect to the battery cell 10, the measurement unit 100 may count a charging and discharging cycle to be 0.5.

As another example, the measurement unit 100 may count charging and discharging cycles by adding charged or discharged SOC amounts. For instance, the measurement unit 100 may add SOC amounts during charging and add SOC amounts during discharging, and count a charging and discharging cycle to be 1 when the total of charged SOC amounts is 100 and the total of discharged SOC amounts is 100.

Here, when the measurement unit 100 counts the number of charging and discharging cycles of the battery cell 10 through SOC, the measurement unit 100 may use any one of various SOC measurement methods publicly known at a point of time when the present disclosure is applied. For example, the measurement unit 100 may estimate SOC by measuring voltages or adding currents at two ends of each battery cell 10.

When the number of charging and discharging cycles is measured by the measurement unit 100, the selection unit 200 receives information about the measured number from the measurement unit 100. Also, the selection unit 200 may determine whether the number of charging and discharging cycles measured with respect to each battery cell 10 reached a reference number. Also, the selection unit 200 determines which one of the battery cells 10 has the number of charging and discharging cycles that reached the reference number. In particular, when there are a plurality of battery cells 10 whose number of charging and discharging cycles reached the reference number, the selection unit 200 may select at least some battery cells 10 from among the plurality of battery cells 10 determined to have the number of charging and discharging cycles that reached the reference number.

For example, in the configuration of FIG. 2, the selection unit 200 may determine which ones of the four battery cells 10 have the number of charging and discharging cycles that reached the reference number. Here, when all of the four battery cells 10 have the numbers of charging and discharging cycles that reached the reference number, the selection unit 200 may select one or more battery cells 10. Also, the selection unit 200 may transmit information about the selected battery cell 10 to the blocking unit 300.

When the battery cell 10 is selected by the selection unit 200, the blocking unit 300 may stop an operation of the selected battery cell 10 for a certain period of time, i.e., for a first reference time. For example, in the configuration of FIG. 2, when one battery cell 10 is selected by the selection unit 200, the blocking unit 300 may block the selected one battery cell 10 from being charged and discharged for the first reference time.

According to such a configuration of the present disclosure, the battery cell 10 whose number of charging and discharging cycles reached a certain level (the reference number) may rest for a predetermined time (the first reference time). Also, accordingly, the life of the battery cell 10 may increase, and as a result, the performance of the battery pack may be stably maintained for a longer period of time.

Meanwhile, the reference number that is a criterion for selecting, by the selection unit 200, the predetermined battery cell 10 may be determined in consideration of various factors, such as characteristics of the battery cell 10 and an operating method of the battery pack.

In particular, the reference number may be set to be at least one of 200 to 400. Furthermore, the reference number may be set to be at least one of 250 to 350. For example, the reference number may be set to be 300. In this case, the selection unit 200 determines the battery cell 10 whose number of charging and discharging cycles measured by the measurement unit 100 reached 300. Also, the selection unit 200 may select all or some of the determined battery cells 10 and provide selection information to the blocking unit 300. A concrete example of such a reference number may be set to be a preferable numerical value via repeated experiments performed on a lithium secondary battery, but the present disclosure is not limited to a concrete numerical value of the reference number.

Preferably, when there are a plurality of battery cells 10 whose number of charging and discharging numbers reached the reference number, the selection unit 200 may sequentially select the battery cells 10 one by one and provide information to the blocking unit 300.

For example, in the configuration of FIG. 2, when a first reference number is 300, and the numbers of charging and discharging cycles of all four battery cells 10 simultaneously reached 300, the selection unit 200 may priorly select only one battery cell 10 therefrom and notify the blocking unit 300. Then, the selection unit 200 may sequentially select the remaining three battery cells 10 one by one and notify the blocking unit 300.

In particular, the selection unit 200 may select another battery cell 10 simultaneously or after an operation the selected battery cell 10 is stopped for a first reference time and then resumed, and notify the blocking unit 300. According to such a configuration of the present disclosure, reduction of capacity or output of the battery pack may be minimized by preventing two or more battery cells 10 from being simultaneously stopped. However, such a configuration of preventing a simultaneous stop may be performed by the blocking unit 300 instead of the selection unit 200. For example, the selection unit 200 may select the two or more battery cells 10 and notify the blocking unit 300, and the blocking unit 300 may sequentially stop operations of the battery cells 10 one by one.

Also, the first reference time that is a period of time when the operation of the battery cell 10 is stopped by the blocking unit 300 may be determined in consideration of various factors, such as characteristics of the battery cell 10 or an operating method of the battery pack. In particular, the first reference time may be set to be at least one time of 2 days (48 hours) to 4 days (96 hours). In detail, the first reference time may be set to be at least one period of 60 hours to 80 hours.

For example, the first reference time may be set to be 3 days (72 hours). In this case, the blocking unit 300 may stop an operation of the battery cell 10 selected by the selection unit 200 for 3 days, and resume the operation again after the 3 days. A concrete example of such a reference number may be set to be a preferable numerical value via repeated experiments performed on a lithium secondary battery, but the present disclosure is not limited to a concrete numerical value of the first reference time.

Also, preferably, the battery pack management apparatus according to the present disclosure may further include a speed reduction unit 400.

When the operation of the battery cell 10 stopped by the blocking unit 300 is resumed, the speed reduction unit 400 may perform charging and discharging for a second reference time at a C-rate lower than a C-rate before being stopped. In other words, the speed reduction unit 400 may be configured to perform charging and discharging on the battery cell 10 whose operation was stopped and then is resumed at a low charging and discharging rate for a certain period of time.

According to such a configuration of the present disclosure, when the operation of the battery cell 10 in a resting state is resumed, the charging or discharging is not performed at a high charging and discharging rate immediately, but is performed at a low charging and discharging rate for a certain period of time such that the battery cell 10 whose operation is stopped is smoothly recovered to a normal level. In other words, the speed reduction unit 400 enables the battery cell 10 whose operation is stopped to have a recovery time. Also, the assigning of such a recovery time may further improve the life of the battery cell 10.

Here, the second reference time may be determined in consideration of various factors, such as characteristics of the battery cell 10 and an operating method of the battery pack. In particular, the second reference time may denote a period of time when one charging and discharging cycle is performed. For example, the speed reduction unit 400 may perform one full charging and one full discharging on the battery cell 10 whose operation is stopped by the blocking unit 300 and then resumed, at a charging and discharging rate lower than a normal level.

Preferably, when the operation of the battery cell 10 that were stopped is resumed, the speed reduction unit 400 may perform charging and discharging at half or less the C-rate before being stopped, for the second reference time. For example, if the battery cell 10 was charged and discharged at 1 C in a normal state before an operation is stopped by the blocking unit 300, the charging and discharging may be performed at 0.5 C or less for the second reference time while the operation is stopped by the blocking unit 300 and then resumed.

Moreover, the speed reduction unit 400 may configure a rate of the C-rate after being stopped to the C-rate before being stopped to be equal to or less than ¼. For example, if the battery cell 10 was charged and discharged at 1 C before being stopped, the charging and discharging may be performed at 0.2 C for a recovery time while the operation is resumed after being stopped. In this case, when the operation of the battery cell 10 is resumed, the speed reduction unit 400 may perform one full charging at 0.2 C and one full discharging at 0.2 C, and then perform charging and discharging at 1 C, i.e., a normal speed.

Meanwhile, the number of reference numbers considered by the selection unit 200 may be two or more.

For instance, whenever the number of the charging and discharging cycles reaches a multiple of a certain number, the selection unit 200 may select the corresponding battery cell 10. For example, whenever the number of charging and discharging cycles reaches a multiple of 300 cycles, such as 300 cycles, 600 cycles, 900 cycles, or 1200 cycles, the selection unit 200 may determine whether there are battery cells 10 whose number of charging and discharging cycles reached the cycle number, and select at least some of the determined battery cells 10. In this case, the blocking unit 300 may repeatedly stop and resume operations of the corresponding battery cells 10 whenever the multiple of 300 cycles is reached.

According to such a configuration, the battery cell 10 may be periodically in a resting state based on the number of charging and discharging cycles.

According to another example, the selection unit 200 may determine and select the battery cell 10 whose number of charging and discharging cycles reached the cycle number at reducing intervals as the charging and discharging cycles increase. For example, the selection unit 200 may gradually decrease an interval of numbers of charging and discharging cycles, such as 500 cycles, 900 cycles, 1200 cycles, and 1400 cycles for selecting the battery cells 10.

According to such a configuration, the battery cell 10 may be controlled to come to a resting state and a recovery state faster and faster as the battery cell 10 is used more. Since the battery cell 10 may deteriorate according to repeated charging and discharging, the battery cell 10 may be adaptively in the resting state and the recovery state according to deterioration so as to further improve the life of the battery cell 10.

Also, preferably, the blocking unit 300 may include a switching device that turns on or off an electric connection of each of the battery cells 10. Also, the blocking unit 300 may block or resume an operation of each of the battery cells 10 by controlling the switching device. This will be described in detail with reference to FIG. 3.

Figure 3:
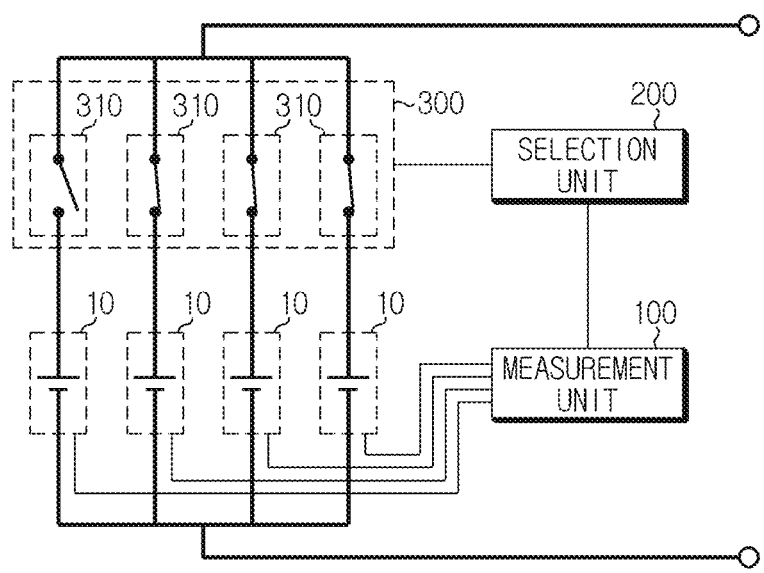
FIG. 3 is a diagram of a structure of a battery pack management apparatus including a blocking unit, according to an embodiment of the present disclosure.

FIG. 3 is a diagram of a structure of a battery pack management apparatus including the blocking unit 300, according to an embodiment of the present disclosure.

Referring to FIG. 3, in a battery pack, in which four battery cells 10 are connected in parallel, the blocking unit 300 includes four switching devices 310, wherein one switching device 310 is provided on a charging and discharging path of each battery cell 10. In this case, the blocking unit 300 may turn on or off each switching device 310 provided therein so as to stop or resume an operation of the battery cell 10.

For example, the blocking unit 300 may turn off the leftmost switching device 310 and maintain the remaining switching devices 310 all in an on-state so as to stop only the operation of the leftmost battery cell 10.

Furthermore, when the operations of all of the four battery cells 10 need to be stopped, the blocking unit 300 may sequentially turn off the switching devices 310 from left to right.

In the drawing, the switching device 310 is illustrated in a simple structure, and a switching device having any one of various structures publicly known at a point of time when the present disclosure was applied, such as a field effect transistor (FET) or a bipolar junction transistor (BJT), may be applied in the blocking unit 300.

Also, although not illustrated, the blocking unit 300 may further include, in addition to the switching device 310, a control device for controlling the switching device 310. In this case, the control device may receive, from the selection unit 200, information about which cell is selected, and turn on or off a charging and discharging device provided on a charging and discharging path of the selected battery cell 10. Also, when a turned-off time passes the first reference time, the control device may turn on the corresponding switching device 310 again such that the battery cell 10 corresponding to the switching device 310 operates again. Also, the control device may receive, from the selection unit 200, selection information about another battery cell 10, and turn off a charging and discharging device provided on a charging and discharging path of the corresponding battery cell 10.

Meanwhile, in the embodiments of FIGS. 2 and 3, a structure of a battery pack, in which the battery cells 10 are connected in parallel, is illustrated, but the present disclosure is not limited by such a structure of the battery pack.

Figure 4:
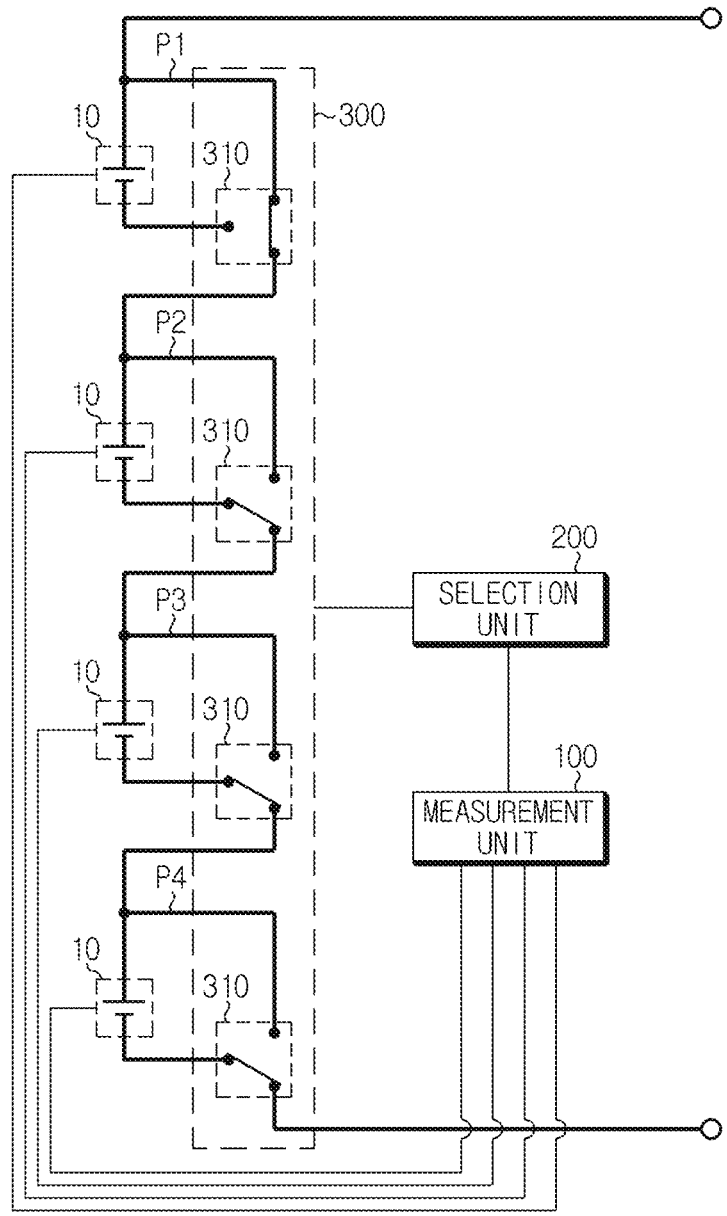
FIG. 4 is a diagram of a structure of a battery pack management apparatus according to another embodiment of the present disclosure.

FIG. 4 is a schematic diagram of a configuration of a battery pack management apparatus according to another embodiment of the present disclosure. Regarding the structure of FIG. 4, details different from the previous embodiment will be mainly described, and details to which the same or similar descriptions are applicable are not provided.

Referring to FIG. 4, a battery pack may include four battery cells 10, wherein the battery cells 10 are electrically connected in series. Also, in each battery cell 10, bypasses P1 through P4 may be provided in parallel such as not to pass the corresponding battery cells 10. Also, the blocking unit 300 may include four switching devices 310. Here, each switching device 310 may be configured as a three-contact switch. In other words, each switching device 310 may be configured such that a first contact is provided at a negative electrode terminal of the battery cell 10, a second contact is provided at the bypass P1, P2, P3, or P4 of the battery cell 10, and a third contact is provided at a positive electrode terminal or charging and discharging path of the other battery cell 10.

In such a configuration, the blocking unit 300 may change a connection contact of each switching device 310 to stop the operation of the corresponding battery cell 10. For example, in the configuration of FIG. 4, the uppermost switching device 310 may be connected to the bypass P1, and the remaining switching devices 310 may be respectively connected to the negative electrode terminals of the battery cells 10. In this case, only the operation of the uppermost battery cell 10 may be stopped, and the remaining three battery cells 10 may normally operate.

Also, the uppermost switching device 310 may be connected to the negative electrode terminal of the battery cell 10, and the switching device 310 provided second from the top may be connected to the bypass P2. In this case, only the operation of the battery cell 10 provided second from the top may be stopped and the remaining three battery cells 10 may normally operate. Also, such switching operations may be sequentially performed on the remaining switching devices 310 such that the operations of all battery cells 10 are sequentially stopped.

Meanwhile, the battery cell 10 according to the present disclosure may include one or more secondary batteries. In FIGS. 2 through 4, each battery cell 10 includes one secondary battery, but the present disclosure is not necessarily limited by such a structure, and each battery cell 10 may include two or more secondary batteries that are connected in series and/or in parallel.

The battery pack management apparatus according to the present disclosure may be applied to the battery pack itself. In other words, the battery pack according to the present disclosure may include the battery pack management apparatus described above. In this case, at least some of the measurement unit 100, the selection unit 200, the blocking unit 300, and the speed reduction unit 400 may be realized by a component already included in the battery pack. For example, the battery pack may include a battery management system (BMS) so as to manage charging and discharging of the battery pack, and at least some of the measurement unit 100, the selection unit 200, the blocking unit 300, and the speed reduction unit 400 may be realized by the BMS.

Also, the battery pack management apparatus according to the present disclosure may be applied to a power storage apparatus. In this case, the power storage apparatus according to the present disclosure may include the battery pack management apparatus according to the present disclosure. In particular, the power storage apparatus is an apparatus used by a smart grid system or an electric vehicle charging station to store power, wherein a life is a very important factor. In the battery pack management apparatus according to the present disclosure, the life of a secondary battery may be increased via charging and discharging control, and thus the battery pack management apparatus may be more advantageously applied to the power storage apparatus. In addition, a battery pack used in the power storage apparatus does not have a high output compared to a battery pack used in the electric vehicle, and includes a very large number of secondary batteries. Accordingly, like the battery pack management apparatus according to an aspect of the present disclosure, the power storage apparatus may be activated without any immoderation to operation performance even when the operations of some battery cells 10 are stopped for a certain period of time or when some battery cells 10 are charged or discharged at a low C-rate.

Figure 5:
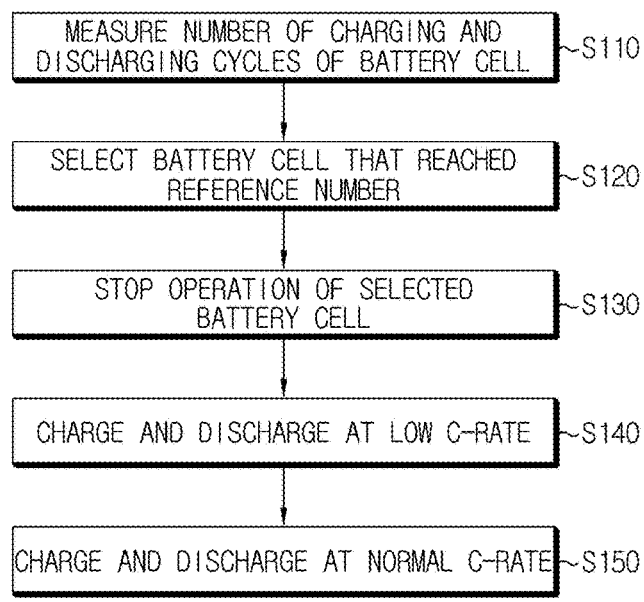
FIG. 5 is a flowchart of a battery pack management method according to an embodiment of the present disclosure.

FIG. 5 is a schematic flowchart of a battery pack management method according to an embodiment of the present disclosure. In the flowchart, a subject of each operation may be several components of the battery pack management apparatus.

As to a method of managing a battery pack in which the plurality of battery cells 10 are electrically connected to each other, according to the present disclosure, the number of charging and discharging cycles of each battery cell is measured first in operation S110, as shown in FIG. 5. Next, battery cells whose numbers of charging and discharging cycles measured in operation S110 reached a reference number are determined, and at least some of the battery cells are selected in operation S120. Then, an operation of the battery cell selected in operation S120 is stopped for a first reference time in operation S130.

Then, after the first reference time, the stopped operation of the battery cell is resumed.

Here, the battery pack management method according to the present disclosure may further include performing charging and discharging on the battery cell whose operation is resumed, for a second reference time at a C-rate lower than a C-rate before being stopped, in operation S140.

Then, after the second reference time, charging and discharging may be performed on the corresponding battery cell at a normal C-rate, i.e., at a C-rate similar to the C-rate before being stopped, in operation S150.

Hereinafter, Example and Comparative Example will be described in detail to describe the present disclosure concretely. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art.

Comparative Example

Charging and discharging cycles of repeating full-charging and full-discharging at 1 C were continuously performed on a lithium secondary battery. Also, capacity retention of the lithium secondary battery was measured per cycle and results thereof were shown in a graph of FIG. 6 as Comparative Example. Here, capacity retention may denote a ratio of full-charging capacity per cycle to initial full-charging capacity (a factory setting) of a secondary battery.

Example

Full-charging and full-discharging were repeatedly performed at 1 C on a lithium secondary battery of the same type as Comparative Example. However, unlike Comparative Example, in Example, an operation of the lithium secondary battery was stopped for 3 days per 300 cycles, and charging and discharging were performed at 0.2 C for 1 cycle at a point of time when the operation is resumed. Also, like Comparative Example, capacity retention of the lithium secondary battery was measured per cycle and results thereof were shown in the graph of FIG. 6 as Example.

Figure 6:
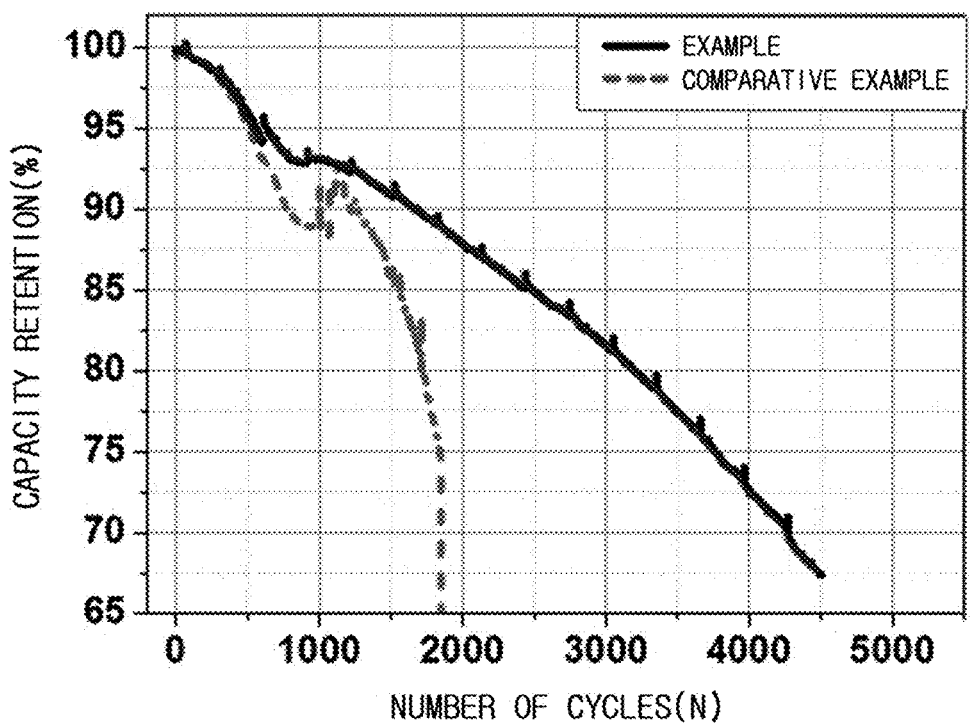
FIG. 6 is a graph of reduction results of capacity retention according to progress of cycles with respect to Example of the present disclosure and Comparative Example.

Referring to the graph of FIG. 6, the secondary battery of Example having a resting state in which the operation is stopped per certain cycles and a recovery state in which charging and discharging are performed at a low charging and discharging rate has remarkably high capacity retention compared to the secondary battery of Comparative Example on which charging and discharging are continuously performed.

In more detail, the secondary battery of Comparative Example showed capacity retention similar to that of the secondary battery of Example up to about 500 cycles, and then showed reduced capacity retention largely different from Example after 500 cycles. In particular, the capacity retention of the secondary battery of Comparative Example is decreased to 65% before about 1900 cycles, but the capacity retention of the secondary battery of Example is close to about 90% even around 1900 cycles. In addition, the secondary battery of Example showed capacity retention of 67.5% even up to 4500 cycles of continued experiments, and thus showed a wide difference from Comparative Example that showed capacity retention of 65% near 1900 cycles.

Accordingly, based on the experiment results of Example and Comparative Example, it is determined that when a secondary battery is charged and discharged according to the embodiments of the present disclosure, capacity retention of the secondary battery is largely improved and thus the life of the secondary battery is remarkably improved.

The present disclosure has been described with reference to definite embodiments and drawings, but the present disclosure is not limited thereto, and various changes and modifications within the scope of the disclosure will become apparent to those skilled in the art from this detailed description.

Meanwhile, the term 'unit', such as a 'measurement unit', a 'selection unit', a 'blocking unit', and a 'speed reduction unit', has been used in the present specification, wherein such a term indicates a logical unit, and does not necessarily indicate a component that is physically separable or has to be physically separated.

What is claimed is:

1. A battery pack management apparatus for managing a battery pack, in which a plurality of battery cells are electrically connected to each other, the battery pack management apparatus comprising:
    a measurement unit configured to measure a number of charging and discharging cycles of each of the plurality of battery cells performed at a first C-rate;
    a selection unit configured to select at least some battery cells from among battery cells whose number of charging and discharging cycles measured by the measurement unit reached a reference number;
    a blocking unit configured to stop operations of only the at least some battery cells selected by the selection unit for a first reference time while the battery pack management apparatus continues charging and discharging battery cells whose number of charging and discharging cycle have not reached the reference number; and
    a speed reduction unit configured to, when the operations of the at least some battery cells stopped by the blocking unit are resumed, perform charging and discharging of the at least some battery cells for a second reference time at a second C-rate lower than the first C-rate before being stopped,
    wherein after the second reference time has elapsed, the at least some battery cells are charged and discharged at a C-rate higher than the second C-rate.

2. The battery pack management apparatus of claim 1, wherein the second reference time is one charging and discharging cycle.

3. The battery pack management apparatus of claim 1, wherein the speed reduction unit is configured to, when the stopped operations of the at least some battery cells are resumed, perform charging and discharging for the second reference time at half or less the first C-rate before being stopped.

4. The battery pack management apparatus of claim 1, wherein the selection unit is configured to sequentially select battery cells one by one when there are a plurality of battery cells whose number of charging and discharging cycles reached the reference number.

5. The battery pack management apparatus of claim 1, wherein the reference number is set to be at least one of 200 to 400.

6. The battery pack management apparatus of claim 1, wherein the first reference time is set to be at least one of 2 days to 4 days.

7. The battery pack management apparatus of claim 1, wherein two or more of the reference numbers are set.

8. The battery pack management apparatus of claim 1, wherein the blocking unit comprises a switching device that turns on or off an electric connection of each of the plurality of battery cells, and is configured to stop or resume an operation of each of the plurality of battery cells by controlling the switching device.

9. A battery pack comprising the battery pack management apparatus of claim 1.

10. A power storage apparatus comprising the battery pack management apparatus of claim 1.

11. A battery pack management method for managing a battery pack, in which a plurality of battery cells are electrically connected to each other, the battery pack management method comprising:
    measuring a number of charging and discharging cycles of each of the plurality of battery cells performed at a first C-rate;
    selecting at least some battery cells from among battery cells whose number of charging and discharging cycles measured in the measuring reached a reference number;
    stopping operations of only the at least some battery cells selected in the selecting for a first reference time while continuing charging and discharging battery cells whose number of charging and discharging cycle have not reached the reference number; then
    resuming operations of the at least some battery cells by performing charging and discharging for a second reference time at a second C-rate lower than the first C-rate before being stopped; and wherein after the second reference time has elapsed, performing charging and discharging of the at least some battery cells at a C-rate higher than the second C-rate.

* * * * *